United States Patent [19]

Bleickardt et al.

[11] 4,096,354
[45] Jun. 20, 1978

[54] APPARATUS FOR DISTINGUISHING BETWEEN FAILURES IN A DIGITAL TRANSMISSION NETWORK

[75] Inventors: Werner Heinrich Bleickardt, Middletown; Virgil Ivancich Johannes, Holmdel, both of N.J.

[73] Assignee: Bell Telephone Laboratories, Incorporated, Murray Hill, N.J.

[21] Appl. No.: 776,544

[22] Filed: Mar. 11, 1977

[51] Int. Cl.² ............................................. H04J 3/14
[52] U.S. Cl. ........................... 179/15 BF; 179/15 BS
[58] Field of Search .......... 179/15 BF, 15 BS, 15 BT; 178/69.1

[56] References Cited

U.S. PATENT DOCUMENTS

| | | | |
|---|---|---|---|
| 3,112,370 | 11/1963 | Longton | 179/15 BF |
| 3,725,593 | 4/1973 | Palombari | 179/15 BF |
| 3,996,423 | 12/1976 | Colton | 179/15 BF |

*Primary Examiner*—David L. Stewart
*Attorney, Agent, or Firm*—Richard J. Roddy

[57] ABSTRACT

At a channel bank, such as a D-type channel bank used in the Bell System, a steady visual alarm is exhibited if the source of a detected failure is at a location either within the channel bank or in the digital hierarchy of a digital transmission network. Unfortunately, a craftsperson is unable to distinguish between the two failure locations. To distinguish between the locations, apparatus for indicating the failure location to be in the hierarchy is situated between the hierarchy and the channel bank and, responsive to an alarm failure signal from the hierarchy, extends a predetermined cyclic code signal to the channel bank. Without modification of the channel bank and responsive to the code signal, a cyclic visual alarm in lieu of the prior art steady alarm is provided thereat.

8 Claims, 4 Drawing Figures

FIG. 3

APPARATUS FOR DISTINGUISHING BETWEEN FAILURES IN A DIGITAL TRANSMISSION NETWORK

BACKGROUND OF THE INVENTION

This invention relates to digital transmission networks and, more particularly, to apparatus for distinguishing between failures occurring in a digital transmission network.

A hallmark of an efficient digital transmission network is the achievement of a quality of service deemed acceptable by the users of the network. One way to express the quality of service is in terms of the number of failures occurring at various levels of the network. An illustrative network is the Bell System digital transmission network wherein the various levels of the digital hierarchy of the network are usually designated in relation to the bit rate of the digital signal there present. For example, a 1.544 megabits per second (Mb/s) signal is designated a DS-1 digital signal. Accordingly, facilities including transmission link for transmitting and receiving the DS-1 signal are usually designated as being at the DS-1 level. As to the DS-1 signal, a typical network includes an analog-to-digital transmitter encoder to quantize a speech sample from a channel and to generate an eight-bit digital character. Digital characters, whether representing data, quantized speech, or other digital signal, from up to 24 channels are then multiplexed by a channel bank into a 193-bit frame. The frame usually includes a one-bit framing signal and 24 time slots, a time slot for a channel. Typically, the framing bit is caused to alternate between a logic zero in one frame and a logic one in the next adjacent frame. It is the frame which is thereafter transmitted as the DS-1 signal. At a receiver, the frame is advantageously de-multiplexed through a receiving channel bank so that each character can be extended to a respective output channel. Of course, other signal levels may also be used in the network. For example, in the Bell System network a 6.312 Mb/s signal is called a DS-2 signal, while a 44.736 Mb/s signal is called a DS-3 signal. Clearly, there being different signal levels, there exists a need to transform signals from one level to another level. Exemplary apparatus for transforming up to four DS-1 signals to or from a single DS-2 signal is an M12 digital multiplex. Still other apparatus is a M13 digital multiplex for transforming up to 28 DS-1 signals to or from a single DS-3 signal.

It should come as no surprise that providing service of a specified quality, perhaps more especially when provided under variable conditions including network growth and unavoidable equipment failure, requires a maintenance plan. Under a maintenance plan the quality of service can be expressed in many ways. One way has been previously mentioned. Another way is in terms of the time required to detect and isolate a failure. It is well known to include failure detection apparatus at each level of a digital transmission network. For example, it is common that alarm control circuitry at a receiving channel bank continuously monitor an incoming digital signal. Occasionally there may be a failure in the digital signal, as for example a loss of frame. Responsive to the detection of the out-of-frame condition, an alarm is normally excited at the receiving channel bank, e.g., it is common that a red lamp be lighted to display a steady condition. Also, the receiving channel bank usually generates a special reverse signal for transmission in the reverse direction. A common reverse signal includes a bit stream having one or more bit positions of each character set to a fixed binary state. The set bits are detected by alarm circuitry at the transmitting channel bank and, responsive thereto, an alarm is excited thereat, e.g., a steady yellow lamp may be lighted. Thusly, if a failure is detected in one direction of transmission, alarms are usually excited at both ends of the network.

For purposes of exposition, we conceptually bifurcate the network between low level equipment, such as a channel bank and its incoming/outgoing transmission link, for processing digital signals at or below the bifurcation signal rate, e.g., the DS-1 rate, and high level equipment, hereinafter called the digital hierarchy, for processing digital signals above the bifurcation rate. If a failure occurs in the digital hierarchy, it will typically propagate downward to a low signal level. As a result, a failure in the digital hierarchy will usually excite alarms at many channel banks. Unfortunately, the conventional alarm is such that a craftsperson who is situated at an alarmed channel bank is unable to distinguish between a digital heirarchy failure and a channel bank failure. Accordingly, the craftsperson typically commences to search for the source of the failure, usually by testing various portions of the channel bank and its incoming/outgoing transmission link. Finding no failure in the channel bank, the craftsperson commonly turns to the hierarchy. Of course, the search procedure may be reversed. Notwithstanding, the expenditure of time in distinguishing between the hierarchy and the channel bank while isolating the failure may lead to degradation in the quality of service.

Accordingly, a broad object of our invention is to provide improved apparatus for distinguishing between failures in a digital transmission network.

It is well known that digital networks are rapidly expanding. As a consequence, vast numbers of network equipments have been built and are being used. To directly modify existing equipment could well be economically unwise.

Accordingly, another object of our invention is to provide distinguishing apparatus without substantial modification to the network.

SUMMARY OF THE INVENTION

These and other objects are achieved in accordance with the principles of our invention by improved apparatus for distinguishing between failures in a digital transmission network. According to one aspect of our invention, failures in the network are distinguished by apparatus which, responsive to the detection of a failure at a second signal level in the network, isolates digital signals within a first signal level. According to another aspect of our invention, failures are distinguished, without substantial modification of the network, by extending a predetermined code signal, illustratively a cyclic code signal, to first level alarm apparatus whereby the first level apparatus provides a dual function. For example, the first level alarm apparatus provides an alternating signal responsive to the cyclic code signal for indicating the failure as occurring in the digital hierarchy and provides a steady signal for indicating the failure as occurring at the first level.

BRIEF DESCRIPTION OF THE DRAWINGS

Our invention should become more apparent from the following detailed description when taken in conjunction with the accompanying drawings in which:

FIG. 3 illustrates a second interval out-of-frame signal providable by the apparatus of FIG. 1.

DETAILED DESCRIPTION

Figure 1:
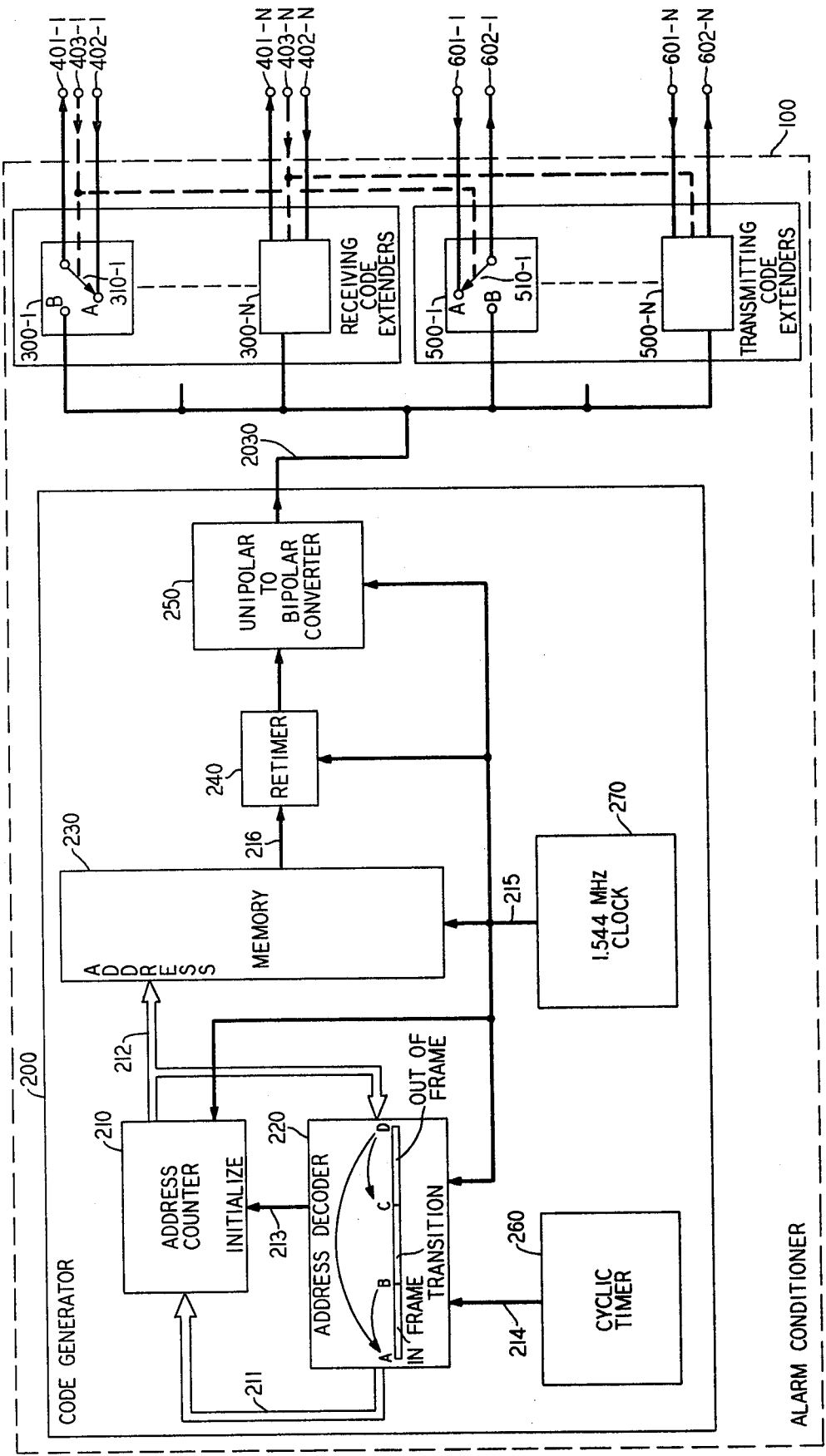
FIG. 1 is a schematic diagram of illustrative apparatus for distinguishing between failures in a digital transmission network in accordance with the principles of our invention.

Turning to FIG. 1, therein is schematically shown illustrative alarm conditioner 100 for distinguishing between failures in a digital transmission network. Broadly, a transmission link, not shown but over which digital signals, after having been transformed from a second signal level to a first signal level, are transmitted, may be cut, for example, by use of a straightforward connector arrangement for inserting conditioner 100. As an aside and for ease of discussion, we assume a unidirectional transmission link and save for later a discussion of the reverse direction of transmission. Continuing, alarm conditioner 100 may be serially inserted between the two ends of the cut by way of one of its receiving code extenders 300-1 through 300-N. Specifically, a first conditioner terminal, such as output terminal 401-1, may be connected to the first level end of the cut and a second conditioner terminal, illustratively input terminal 402-1, may be connected toward the second level end of the cut. As a further aside and for purposes of more clearly describing the principles of our invention, we choose to ignore the semantical hindrance introduced by a discussion of the signal level of the transmission link. Such is understood not to be a limitation but rather only an avoidance of unnecessary verbiage in the description of our illustrative embodiment. Certainly, conditioner 100 need not transform signals from one signal level to another signal level but, as will shortly be made clear, operates on or is responsive to signals from or to one or more signal levels. Therefore, when so inserted, alarm conditioner 100 may or may not effectuate a functional change in the operation of the network. That is to say, on the one hand, with switch 310-1 of code extender 300-1 having its wiper in position A, digital signals supplied to input terminal 402-1 pass straight through conditioner 100 from the second level to the first level. In particular, digital signals supplied by the second level and transformed, for example, by a digital multiplex to a first level signal pass from the second level through terminal 402-1 thence through the wiper of switch 310-1 and by way of terminal 401-1 onto the first level. Hence, in position A, there is no functional change to the network operation. Accordingly, the aforediscussed prior art problems related to distinguishing between failures may arise.

However, on the other hand and in accordance with one aspect of our invention for distinguishing between failures, responsive to a failure signal for indicating the detection of a failure at a second signal level, the digital signal provided to the input terminal is isolated within the first signal level. By way of exemplification, responsive to the failure signal being provided to a third conditioner terminal, e.g., to failure signal terminal 403-1, the wiper of a corresponding code extender switch, here switch 310-1, may move from position A to position B. As a result, digital signals from the failure level are isolated within the first level. In our illustrative embodiment, responsive to the failure signal, digital signals provided to input terminal 402-1 are thusly isolated from output terminal 401-1 and hence within the first level. Fortuitously, inasmuch as a failure in a second level, e.g., in a level somewhere in the digital heirarchy, is typically reflected as a failure within the digital signal, a failure in the digital hierarchy is obviated from exciting low level alarm circuitry such as that situated at a first level channel bank. Thereby, a misleading alarm signal is obviated at the channel bank with a concomitant distinguishability between failures in the network.

According to a second aspect of our invention for distinguishing between failures, responsive to the failure signal, a predetermined code signal, rather than the digital signal, is extended to the first level for exciting same in a predetermined manner while mitigating modification of first level equipment. Broadly, the code signal is extended from code generator 200 over lead 2030 jointly to an input of each of receiving extenders 300-1 through 300-N and, as later discussed, to an input of each of transmitting code extenders 500-1 through 500-N. In that connection, alarm conditioner 100 may be situated near a digital multiplex. Thereby, a single code generator could conveniently serve a plurality of code extenders, e.g., a code extender for a channel bank. Continuing, responsive to the failure signal detected at the third conditioner terminal, the wiper of a code extender switch is moved from position A to position B. As a result, the code signal on lead 2030 is extendable onto the first signal level, e.g., onto a channel bank, by way of the switch wiper and terminal 401-1. Fortuitously our code signal is a predetermined signal, responsive to which common alarm circuitry at the first level, without modification of the first level equipment, provides an alarm indicative of the occurrence of a failure at a level other than the first level. Advantageously, in accord with our invention, common alarm indication apparatus serves a dual function. Further, not only is the occurrence of the failure brought to the attention of a craftsperson at the first level, but the location of the failure is distinguished as occurring at some level other than the first level, e.g. in the digital hierarchy.

As aforementioned, should the digital signal provided to input terminal 402-1 be out-of-frame (OOF) and the OOF digital signal be extended to the first level, alarm circuitry at the first level would usually be excited. A customary response to the excitation is the exhibition of a steady visual signal, e.g., a red lamp is lighted. In accord with this second aspect of our invention, a predetermined code signal is substituted for the OOF digital signal. An illustrative code signal is a cyclic signal having, in a first time interval thereof, an in-frame digital signal, and in a second interval, an out-of-frame digital signal. Advantageously, responsive to such a cyclic signal, first level alarm circuitry, without being modified, provides a second function, i.e., the function of distinguishing between failures. Specifically, the customary steady alarm condition is exhibited for a channel bank failure. However, the second function is exhibited as an alternating, or a cyclic, rather than a steady, alarm condition for a hierarchy failure.

Figure 2:
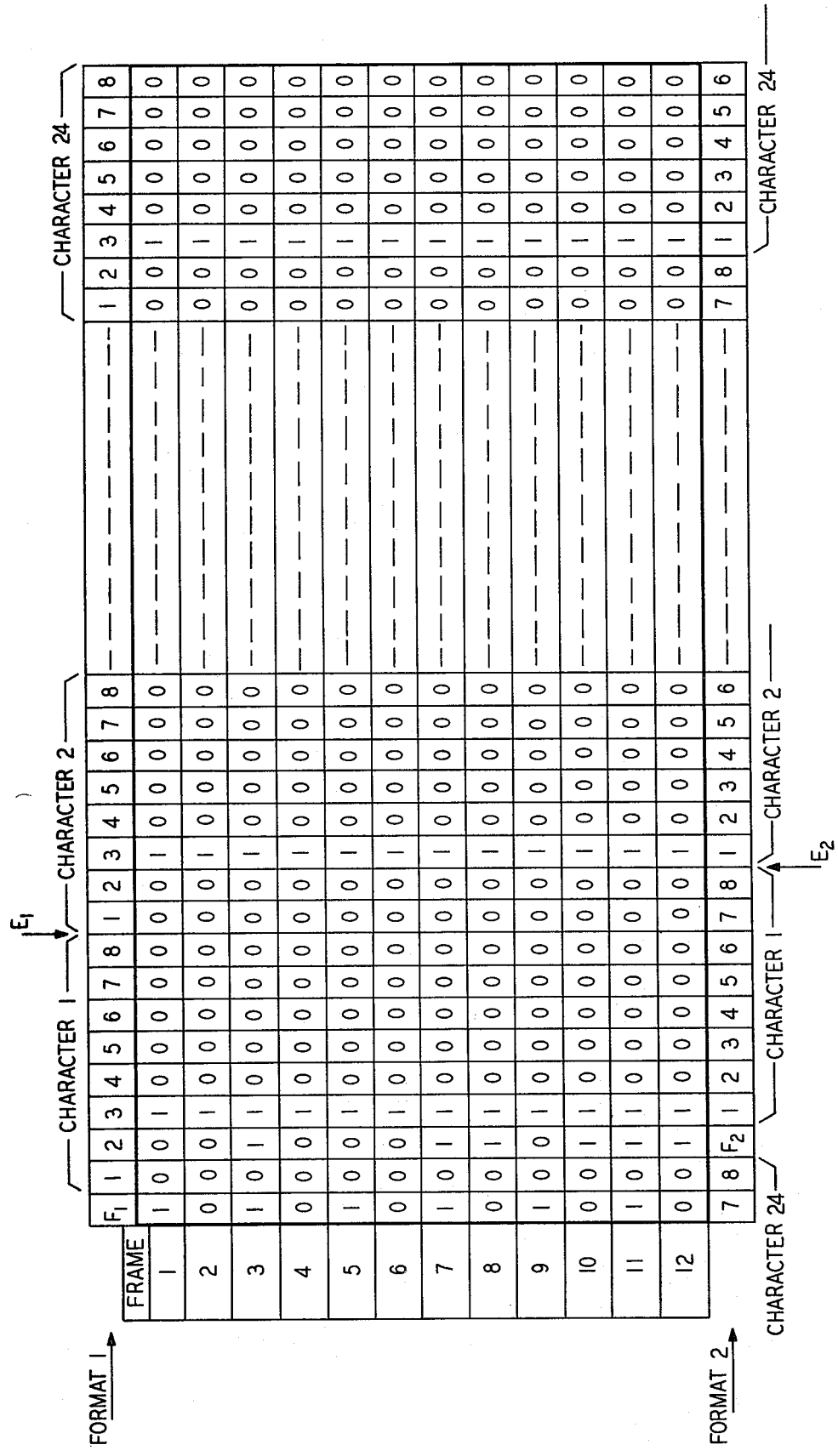
FIG. 2 illustrates a first interval-in-frame signal providable by the apparatus of FIG. 1.
Figure 3:
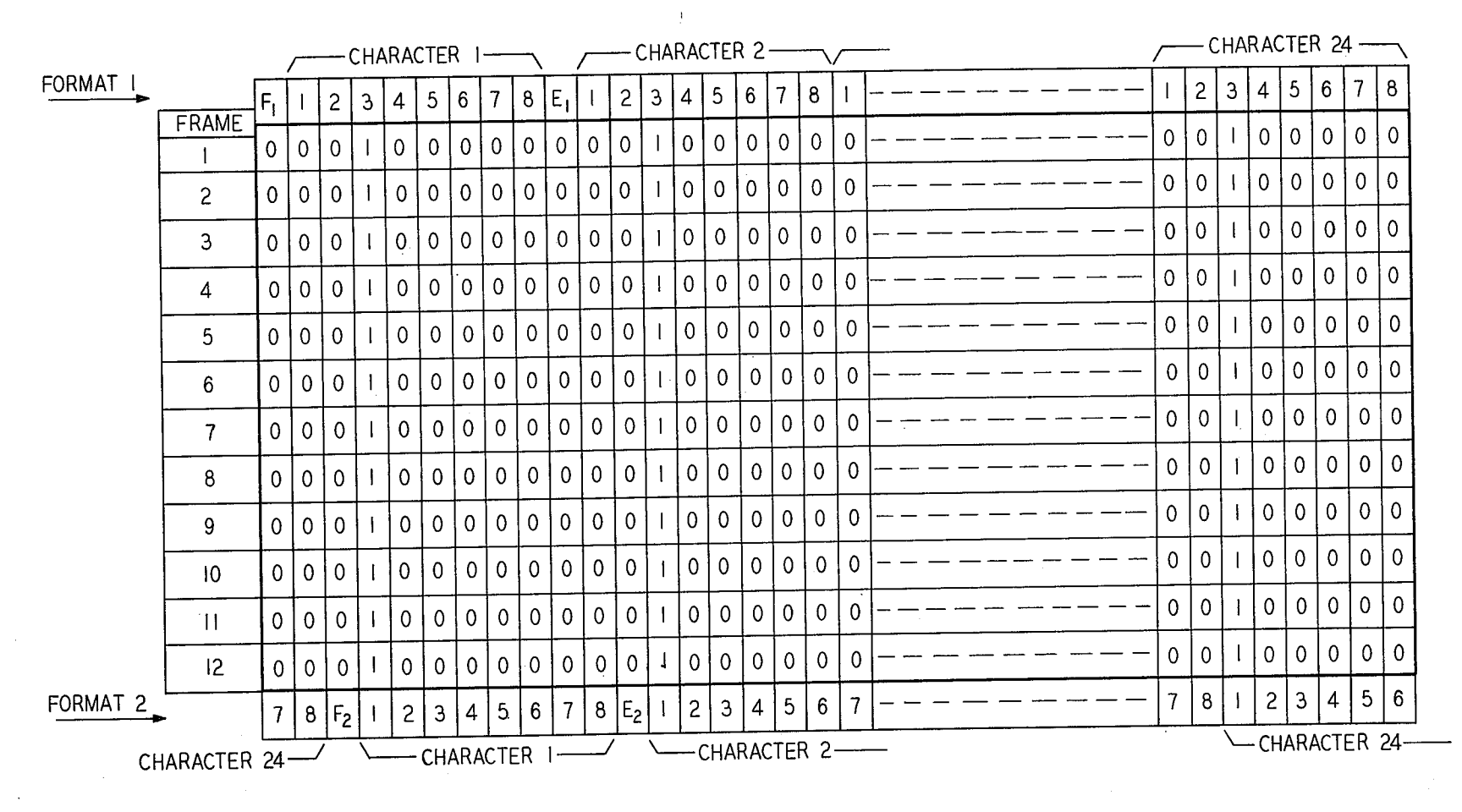

As to our illustrative code signal, FIG. 2 illustrates a first interval in-frame signal, while FIG. 3 illustrates a second interval out-of-frame signal. First, we describe the first interval in-frame signal. Our illustrative in-frame signal comprises a 12-frame superframe. Each of the 12 193-bit frames is illustrated in a respective row of FIG. 2, wherein adjacent rows are illustrative of adjacent frames in the superframe. As aforedescribed, a typical frame includes a framing bit and 24 eight-bit characters. As to the framing bit, it is common that different channel banks expect different framing sequences. In order to illustrate, in part, the broad utility of conditioner 100, our in-frame signal includes two signal formats, each consistent with the DS-1, first level signal format used in certain commercially available channel banks. For example, FORMAT 1 is consistent with DS-1format used in a channel bank such as the Bell System D1A channel bank. On the other hand, FORMAT 2 is consistent with the DS-1 format used in channel banks such as the D2 channel bank. Each format is so labeled, respectively at the top or bottom of FIG. 2. Fortunately, our illustrative single code signal includes two formats and thereby accommodates the format requirements of a plurality of channel banks. More specifically, FORMAT 1 includes a format having the aforedescribed alternating logic zero/logic one framing bit pattern, the latter being illustrated within the column labeled $F_1$ of FIG. 2. It should be observed that the well known alternating of logic zero and logic one is evidenced by viewing adjacent frames of the superframe. Also, known transmission link equipment, such as is used in the T-carrier System, usually requires the transmitted signal to include a minimum density of logic ones. Accordingly, within FORMAT 1 the density requirement is met by setting the third bit of each eight-bit time slot character to a logic one, other time slot bits, but for the about to be described FORMAT 2, being logic zero. In addition, the special reverse signal, previously mentioned, later discussed and used in known channel banks, includes certain specific hits thereof being logic zero.

FORMAT 2, which is time shifted two bits with respect to FORMAT 1, includes a framing bit pattern comprising two framing bit sequences, a first called a terminal frame bit sequence and a second called a subframe bit sequence. As to the terminal frame bit sequence, the well known alternating logic zero/logic one bit pattern is again employed. However, rather than being employed in adjacent frames as in FORMAT 1, the alternating bit pattern of FORMAT 2 is employed in nonadjacent frames, herein illustratively in odd numbered frames. Combined therewith is the subframe sequence, appearing herein in the even numbered frames of a superframe. Specifically, rather than alternating between a single logic zero and a single logic one as in terminal frame sequence, the subframe sequence alternates between a plurality of logic zeros and a plurality of logic ones. Our subframe sequence includes a plurality of three logic zeros located, respectively in even numbered frames 2, 4 and 6, followed by three logic ones, located respectively in frames 8, 10 and 12. The combined terminal/subframe sequence according to FORMAT 2 is illustrated in FIG. 2 in the column labeled $F_2$. More particularly, the combined sequence is there illustrated for frames 1 to 12 as "001000110111". From the above, it is clear that the framing bits of FORMAT 1 are embedded within FORMAT 2, appearing therein in bit 7 of character 24 of each frame thereof. In parallel, the framing bits of FORMAT 2 are embedded within FORMAT 1, appearing therein in bit 2 of character one. As just described, two signal formats are included in our illustrative in-frame signal. Just as clearly, one skilled in the art by applying the aforedescribed teachings can provide a code signal including three or more such formats to accommodate still another or other channel banks.

Next, we describe the second interval out-of-frame signal. As aforementioned, an out-of-frame (OOF) digital signal provided to input terminal 402-1, if extended within the first level, would be a stimulus to effectuate an activation of alarm circuitry thereat. Another OOF signal is our illustrative second interval signal, shown in FIG. 3 as including a 194-bit frame. Specifically, our second interval signal also comprises a 12-frame superframe. However, each second interval frame includes 194-bits, the extra bit being obtained by repeating the framing bit of the frame and being situated after the first character of the frame. Otherwise, each second interval frame is substantially identical to a corresponding frame in our first interval signal. In addition, the framing bit pattern includes a single logic state, here a pattern of logic zeroes. Accordingly, the frame bit of FORMAT 1, labelled $F_1$ at the top of FIG. 3, is repeated after the first character, the repeated bit being labelled $E_1$. Similarly, the frame bit of FORMAT 2, labelled $F_2$ at the bottom of FIG. 3, is repeated after the first character and is there labelled $E_2$. Noteworthy, each frame of our second interval signal consists of the same bit pattern as an adjacent frame. Efficiently therefrom, only one frame need be stored in memory 230 of our soon to be described code generator 200. Inasmuch as the framing bit pattern in our second interval signal is in disharmony with a usually expected in-frame framing pattern, our second interval signal would be detectable as out-of-frame by common alarm circuitry at a channel bank. Thusly, responsive to the detection of the absence of the expected framing pattern, i.e., upon detection of the forced out-of-frame condition, first level alarm circuitry excites the aforementioned alarm at the channel bank, e.g., the red lamp is lighted. So much for our second interval signal.

Advantageously, because of the cyclic nature of our predetermined code signal, channel bank alarms are cyclically operated. Hence, in accord with the principles of our invention, the function of alarm circuitry at common channel banks is broadened for distinguishing between failure levels without substantially modifying the network.

Returning to FIG. 1, code generator 200 of alarm conditioner 100 provides our cyclic code signal over lead 2030 to one or more code extenders 300-1 through 300-N and 500-1 through 500-N. Broadly, our code signal is stored within memory 230, which may be a state of the art read-only memory. Responsive to a cyclic timer signal extended from cyclic timer 260 over lead 214 to address decoder 220, an initializing address is extended therefrom over cable 211 to address counter 210. Address counter 210 may be a straightforward binary counter for extending a memory address, beginning at the initializing address and thereafter incremented for addressing consecutive memory locations. Specifically, address counter 210 is initialized to the address on cable 211 responsive to an initialize signal provided thereto over lead 213. Thereafter, responsive to a clock signal from clock 270, an address is extended from counter 210 over cable 212 jointly to an address input of memory 230 and to an input of address decoder 220. As will become evident shortly, address decoder 220 is for monitoring the address of the memory location to be read and, responsive to selected ones of the addresses, for initializing address counter 210. For example, four selected memory locations, i.e., locations A, B, C, D and identified in standard logic diagram notation within decoder 220. The four locations correspond to bit locations within memory 230 wherein are stored in a consecutive manner, the start and end of the first interval in-frame signal and start and end of the second interval OOF-signals, illustrated respectively in FIGS. 2 and 3. Thusly, responsive to clock 270 for providing a clock pulse at a rate consistent with the bit rate at the first signal level, here at a 1.544 MHz DS-1 rate, each bit of our cyclic code signal is read from a consecutive memory location, the location corresponding to the address appearing on cable 212, and extended from memory 230 over lead 216 through standard retimer 270 and unipolar-to-bipolar converter 250 onto lead 2030.

More especially, our cylic code signal includes a first interval in-frame signal and a second interval out-of-frame signal. Illustratively, the time duration of each interval is approximately equal, it being found that a nominal time duration of about 1.8 seconds for each interval is acceptable for DS-1 signal level equipment. Accordingly, timer 260 for controlling the time duration issues an in-frame logic one timer signal for an interval of about 1.8 seconds. The in-frame timer signal is followed by an out-of-frame logic zero timer signal for a like interval of about 1.8 seconds. Thereafter, the cyclic timer signal is repeated. Responsive to an in-frame timer signal on lead 214, a first initializing address is extended over cable 211 to address counter 210. For example, the first initializing address is the address of memory location A (shown in decoder 220), in which is stored, using for purposes of exposition only FORMAT 1 in FIG. 2, the $F_1$ bit of frame 1. Thereafter, responsive to the 1.544 MHz first level clock signal provided by clock 270, consecutive locations within memory 230 are read and the contents thereof provided to lead 2030. That is, after the $F_1$ bit, bit 1 of character 1 of frame 1 is read and so provided to lead 2030, et cetera. The consecutive reading continues for each bit of each frame until bit 8 of character 24 of frame 12, which is stored in memory location B (as shown in decoder 220). As aforementioned, the address provided to memory 230 is also provided to an input of address decoder 220 for decoding. In decoding, responsive to the in-frame timer signal provided by timer 260 and upon detection on cable 212 of the address of location B, the first initializing address, i.e., the address of location A, is again extended over cable 21 for repetitively transmitting the in-frame cyclic code signal. Noteworthy, the bits of each in-frame superframe, consisting of (12 × 193 =) 2316 bits in our illustrative embodiment, are provided over lead 2030 at a rate of about 1.544 Mb/s. Accordingly, about 1200 superframes are extended to the channel bank during the nominal 1.8 second in-frame interval of the cyclic code. At the end of the first 1.8 second interval, timer 260 extends a logic zero out-of-frame timer signal over lead 214. Responsive to the detection of the logic zero timer signal, address decoder 220 extends a second initializing address to address counter 210. For example, the second initializing address is the address of memory location C (shown in decoder 220) in which is stored the first bit of our second interval OOF signal, as shown in FIG. 3. In a manner similar to that aforedescribed, the second interval signal is read from memory 230 and, after the aforementioned retiming and converting operations, provided to lead 2030. Inasmuch as each frame in our second interval superframe is identical, a single 194-bit frame may be repetitively read from memory 230. Also paralleling the in-frame interval of our cyclic code signal, address detector 220 in monitoring addresses on cable 212 eventually detects the address of memory location D (as shown in decoder 220) for storing the last bit of our second interval signal. In decoding, upon detection of the address of location D, either of two events could happen. On the one hand, responsive to the OOF timer signal provided by timer 260, the second initializing address, i.e., the address of location C, is extended over cable 211 for repeating our second interval signal. On the other hand, responsive to an in-frame timer signal provided by timer 260, the first initializing address, i.e., the address of location A, is extended over cable 211 for providing our first interval in-frame signal. Thereby, an alternation occurs between the first and second intervals for providing our cyclic code.

Figure 4:
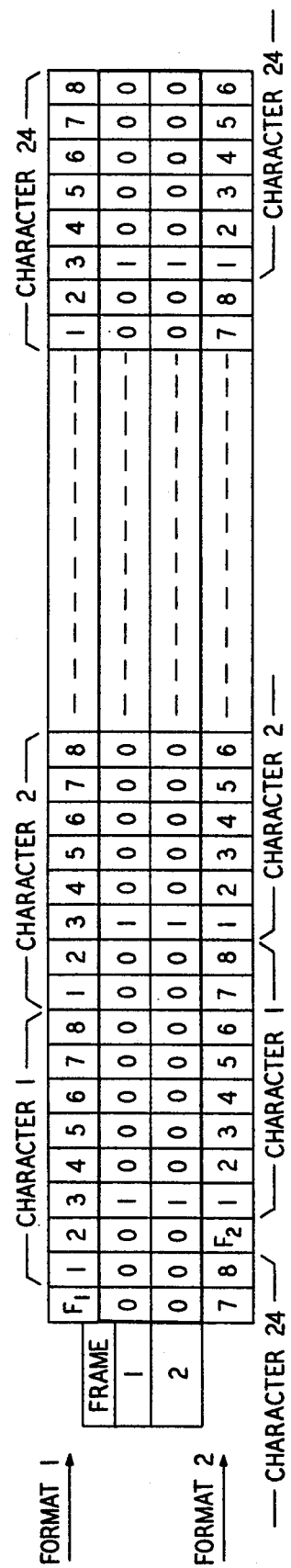
FIG. 4 illustrates a transition signal providable by the apparatus of FIG. 1.

In addition to the first and second interval signals just described, our cyclic code signal advantageously anticipates a solution to an alarm release problem. Alarm circuitry in some channel banks not only expects a synchronized signal, such as that provided by our first and second interval signals, but also would expect a prefixed phase relationship between the cyclic code signal and channel bank frame countdown circuitry. Absent such a relationship, known alarm circuitry may fail to release an office alarm. Such a phase relationship is readily attainable by way of a prefixed transistion signal such as that illustrated in our FIG. 4. The transition signal includes two 193-bit frames bit-wise storable in memory 230 between the first and second interval signals. In our illustrative embodiment, the transition signal is stored between locations (B + 1) and (C − 1). Specifically, upon detection of an in-frame-to-OOF state change signal on lead 214, i.e., the signal thereon changes from a logic one to a logic zero, address decoder 220 inhibits an initialization of counter 210. More particularly, upon detection of the address of location B on cable 212, address decoder 220 extends the address of location A over cable 211 and provides the initialize signal to lead 213. In inhibiting the initialization of counter 210, an inhibit signal, rather than initialize signal, is extended over lead 213. Responsive thereto, counter 210 continues to be incremented from the address of location B to the address of location (B + 1). Therefore, the transition signal, being bit-wise stored in memory 230 contiguous with the first interval in-frame signal, is transmitted to the first level. Noteworthy, each frame of our transition signal includes a framing bit set to a single logic state, illustratively to a logic zero state. As a result, D1 type channel bank equipment, for example, will usually detect an out-of-frame condition after the two transition frames have been received and, responsive thereto, its alarm circuitry will typically activate countdown apparatus for reframing. During the reframing, the countdown apparatus commonly uses a shifting operation including adding an extra bit to each frame, thus resulting in a 194-bit frame. Advantageously, our second interval signal being stored in memory 230 bit-wise after the transition signal, i.e., beginning at location C, is transmitted after the transition signal. As mentioned our second interval signal includes a predetermined 194-bit out-of-frame frame to force the out-of-frame condition. On the other hand, still other channel bank equipment, such as D2 channel bank equipment, may not need a transition signal but rather commonly would detect an out-of-frame condition responsive to our second interval signal. Thereby, our predetermined code signal fortunately obviates an alarm release problem.

As mentioned hereinabove, the description to this point has been, for ease of discussion, in terms of a unidirectional transmission link from the second to the first level. As also mentioned, the receiving channel bank at the first level usually generates a special reverse signal for transmission in the reverse direction. The reverse signal is for stimulating a transmitting channel bank to display a second alarm signal, e.g., a steady yellow lamp. As with the framing bit pattern, it is common that different channel banks expect different reverse signals. For example, channel banks of the type designed for a FORMAT 1 signal typically expect a reverse signal having a logic zero in bit one and bit eight of each character in the frame. In a similar manner, FORMAT 2 channel banks expect a logic zero in bit two of each character. Fortuitously, our predetermined code signal includes both expected reverse signals. As to transmitting the code signal to the transmitting channel bank, alarm conditioner 100 includes transmitting code extenders 500-1 through 500-N. Each transmitting code extender, for example 500-1, is, for purposes of illustration, the dual of a receiving code extender. Also, a failure signal provided to the third failure conditioner terminal, for example to terminal 403-1, is extended jointly to control the wiper of both a receiving code extender and a transmitting code extender for concurrently moving the wiper of each from an A position to a B position or vice versa. Too, signals from one first level to another first level, e.g., from a receiving channel bank to a transmitting channel bank, are supplied to a transmitting input terminal e.g., to terminal 601-1, thence through a respective transmitting code extender to a transmitting output terminal, such as terminal 602-1. As should be clear from the aforegoing, our predetermined cyclic code signal is provided over lead 2030 jointly to an input of each receiving and transmitting code extender. Accordingly, when the wiper of a code extender, responsive to the failure signal detected at the third conditioner terminal, moves from position A to position B, our predetermined code signal is not only transmitted to the first level by way of a receiving code extender but is also transmitted to a transmitting channel bank by way of a transmitting code extender as the special reverse signal.

Although our invention has been described and illustrated in detail, it is to be understood that the same is by way of illustration. Various modifications will occur to those skilled in the art. Accordingly, our invention is not to be considered limited to the embodiment above discussed for purposes of disclosure. Rather, the spirit and scope of our invention are limited only by the appended claims.

We claim:

1. Apparatus for signaling a failure in a digital transmission network, said apparatus comprising:
   an output terminal adapted to transmit a digital signal to a first signal level of the digital hierarchy of said network,
   a failure signal terminal adapted to receive a failure signal from a signal level,
   an input terminal adapted to receive a digital signal from a second signal level,
   means responsive to said failure signal for distinguishing between failures in said network,
   said distinguishing means including code extender means for selectively coupling said input terminal to said outpt terminal and
   means for extending a predetermined code signal through said code extender means to said output terminal.

2. The apparatus defined in claim 1 wherein said distinguishing means further comprises
   means responsive to said failure signal for isolating said input digital signal from said output terminal while said predetermined code signal is extended thereto.

3. Apparatus for signaling a failure in a digital transmission network,
   said failure signaling apparatus including first alarm apparatus for providing a first alarm signal responsive to a signal indicating the detection of a failure located at a first signal level of the digital hierarchy of said network,
   second alarm apparatus for providing a second alarm signal responsive to a signal indicating the detection of a failure located at a second signal level of said network,
   means for extending said first and said second alarm signals to respective inputs of third alarm apparatus, said third alarm apparatus responsive to one of said first or said second alarm signals for providing an alarm indicating in a first manner at said first level,
   and characterized in that said failure signaling apparatus further comprises means for distinguishing between said network failure locations,
   said distinguishing means including means adapted for receiving a third alarm signal responsive to the detection of a failure located at said second level,
   means responsive to said third alarm signal for providing a predetermined code signal,
   means for extending said predetermined code signal to said third alarm apparatus whereby said third alarm apparatus provides an alarm indication in a second manner, said second manner for indicating that a failure occurred at a level other than at said first level.

4. The apparatus defined in claim 3 wherein said first manner alarm indication includes a steady signal and said second manner alarm indication includes a non-steady signal.

5. The apparatus defined in claim 3 wherein said predetermined code signal is a cyclic code signal, said cyclic code signal including a first interval signal and a second interval signal.

6. The apparatus defined in claim 5 wherein said first interval cyclic code signal includes at least one signal format for inhibiting said third alarm apparatus from signaling a misleading failure location.

7. The apparatus defined in claim 5 further comprising means for alternating said cyclic code signal between said first interval signal and said second interval signal whereby said third alarm apparatus provides an alternating alarm signal for indicating that a failure occurred at a level other than at said first level.

8. The apparatus defined in claim 5 wherein said predetermined cyclic code signal includes a plurality of first level signal formats and wherein first level apparatus includes said third alarm apparatus, said third alarm apparatus being responsive to at least one of said signal formats for providing said alarm indication.

* * * * *